(12) United States Patent
Park (10) Patent No.: US 10,602,439 B2
(45) Date of Patent: Mar. 24, 2020

(54) METHOD FOR WIFI ASSOCIATION AND ELECTRONIC DEVICE THEREOF

(71) Applicant: Samsung Electronics Co., Ltd., Suwon-si, Gyeonggi-do (KR)

(72) Inventor: Youn-Ho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 13/921,604

(22) Filed: Jun. 19, 2013

(65) Prior Publication Data

US 2014/0003407 A1   Jan. 2, 2014

(30) Foreign Application Priority Data

Jul. 2, 2012 (KR) ........................ 10-2012-0071962

(51) Int. Cl.
*H04W 48/00* (2009.01)
*H04W 48/20* (2009.01)
*H04W 84/12* (2009.01)

(52) U.S. Cl.
CPC .......... *H04W 48/20* (2013.01); *H04W 48/17* (2013.01); *H04W 84/12* (2013.01)

(58) Field of Classification Search
CPC ....... G01S 5/14; G01S 5/0236; H04L 9/0891; H04L 12/189; H04L 63/101; H04L 63/104; H04L 2209/80; H04W 4/06; H04W 4/008; H04W 8/005; H04W 12/04; H04W 12/06; H04W 12/08; H04W 12/12; H04W 48/16; H04W 48/20; H04W 64/00; H04W 76/02; H04W 84/12; H04W 88/02; H04W 88/06; H04W 88/08
See application file for complete search history.

(56) References Cited

U.S. PATENT DOCUMENTS

| 8,155,081 B1* | 4/2012 | Mater ..................... H04W 4/04 370/254 |
| 9,060,320 B1* | 6/2015 | Cairns ................... H04W 48/00 |
| 2004/0066759 A1* | 4/2004 | Molteni ................ H04L 41/048 370/329 |

(Continued)

FOREIGN PATENT DOCUMENTS

| CN | 102204349 A | 9/2011 |
| KR | 10-2009-0121354 A | 11/2009 |

(Continued)

OTHER PUBLICATIONS

European Office Action dated Mar. 7, 2018, issued in European Application No. 13173214.1-1214.

(Continued)

*Primary Examiner* — Marsha D Banks Harold
*Assistant Examiner* — Dharmesh J Patel
(74) *Attorney, Agent, or Firm* — Jefferson IP Law, LLP (57) ABSTRACT

A method and apparatus for connecting to an Access Point (AP) by which an electronic device can access the Internet are provided. The method includes examining whether an Internet access is requested, determining a candidate AP for providing the Internet access, determining an available AP among the determined candidate APs, displaying the determined candidate AP and available AP, and providing an Internet service on the basis of a specific AP among the determined available APs.

9 Claims, 6 Drawing Sheets

(56) References Cited

U.S. PATENT DOCUMENTS

| | | | | |
|---|---|---|---|---|
| 2006/0153138 | A1* | 7/2006 | Asoh | H04W 48/20 370/332 |
| 2007/0091859 | A1* | 4/2007 | Sethi | H04L 29/12311 370/338 |
| 2010/0110921 | A1 | 5/2010 | Famolari et al. | |
| 2010/0290337 | A1* | 11/2010 | Suvi | H04W 12/08 370/217 |
| 2011/0216692 | A1* | 9/2011 | Lundsgaard | H04W 48/20 370/328 |
| 2011/0249622 | A1* | 10/2011 | Takeda | H04W 48/20 370/328 |
| 2011/0286437 | A1 | 11/2011 | Austin et al. | |
| 2012/0057578 | A1* | 3/2012 | Park | H04W 76/02 370/338 |

FOREIGN PATENT DOCUMENTS

| | | |
|---|---|---|
| KR | 10-2012-0025114 A | 3/2012 |
| KR | 10-2012-0064954 A | 6/2012 |

OTHER PUBLICATIONS

European Office Action dated Nov. 20, 2018, issued in the European Application No. 13 173 214.1-1214.

European Preliminary Opinion dated Oct. 22, 2018, issued in European Application No. 13 173 214.1.

Microsoft; Appendix K: Network Connectivity Status Indicator and Resulting Internet Communication in Windows Vista; https://docs.microsoft.com/en-us/previous-versions/windows/it-pro/windows-vista/cc766017(v=ws,10); Nov. 25, 2008.

Youtube; How to connect Windows Vista to your wireless network; NetComm Wireless; http://www.youtube.com/watch?v=_i9JsFH2w4s; Nov. 12, 2009.

Superuser Community Blog; Windows 7 Network Awareness; How Windows knows it has an internet connection; https://blog.superuser.com/2011/05/16/windows-7-network-awareness/; May 16, 2011.

Microsoft; Appendix H: Network Connectivity Status Indicator and Resulting Internet Communication in Windows 7 and Windows Server 2008 R2; https://docs.microsoft.com/en-us/previous-versions/windows/it-pro/windows-server-2008-R2-and-2008/ee126135(v=ws,10); Jun. 12, 2013.

* cited by examiner

METHOD FOR WIFI ASSOCIATION AND ELECTRONIC DEVICE THEREOF

PRIORITY

This application claims the benefit under 35 U.S.C. § 119(a) of a Korean patent application filed on Jul. 2, 2012 in the Korean Intellectual Property Office and assigned Serial No. 10-2012-0071962, the entire disclosure of which is hereby incorporated by reference.

BACKGROUND OF THE INVENTION

1. Field of the Invention

The present invention relates to a method and apparatus for providing an Internet service. More particularly, the present invention relates to a method and apparatus for providing an Internet service by searching for an Internet-access enabled Access Point (AP) and by automatically connecting to a found AP in a Wireless Fidelity (Wi-Fi) network.

2. Description of the Related Art

An electronic device using Wi-Fi cannot determine whether the Internet can be accessed when the electronic device is simply connected to an Access Point (AP). In other words, mere connection to an AP does not necessarily ensure that the electronic device will have access to the Internet. Therefore, even if the Internet cannot be used in practice, the electronic device maintains its connection to the AP. The Internet cannot be used in the following cases.

First, when the electronic device using Wi-Fi fails to acquire a valid Internet Protocol (IP) address. When there is a Dynamic Host Configuration Protocol (DHCP) problem or when the electronic device establishes a connection to a wrong AP, the electronic device using Wi-Fi acquires an invalid IP address (e.g., 169.254.x.x). In this case, the electronic device using Wi-Fi cannot provide an Internet service to the electronic device due to the invalid IP address.

In addition, when the AP itself is not connected to the Internet or the AP cannot transmit and receive a packet through the Internet, the AP is unable to provide an Internet service to the electronic device. For example, even if the electronic device using Wi-Fi acquires the valid IP address, the AP itself cannot transmit and receive the packet through the Internet. In this case, the electronic device using Wi-Fi may not be able to use the Internet or may be able to use only an intranet.

As such, when the electronic device using Wi-Fi is connected to an Internet disabled AP, there is a problem in that the electronic device is no longer able to attempt to connect to the AP even if an Internet enabled AP is included in an AP list of the electronic device using Wi-Fi.

Accordingly, there is a need for a method and apparatus for automatically connecting to an Internet-access enabled AP.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to solve at least the above-mentioned problems and/or disadvantages and to provide at least the advantages described below. Accordingly, an aspect of the present invention is to provide a Wireless Fidelity (Wi-Fi) access method and an electronic device thereof.

Another aspect of the present invention is to provide an electronic device and a method for determining an Internet-access enabled Access Point (AP).

Another aspect of the present invention is to provide an apparatus and a method for connecting to an Internet-access enabled AP.

In accordance with a first aspect of the present invention, a method of connecting to an AP by which an electronic device can access the Internet is provided. The method includes examining whether an Internet access is requested, determining a candidate AP for providing the Internet access, determining an available AP among the determined candidate APs, displaying the determined candidate AP and available AP, and providing an Internet service on the basis of a specific AP among the determined available APs.

In accordance with a second aspect of the present invention, an electronic device is provided. The device includes a display, at least one modem processor, at least one processor, a memory, and at least one program stored in the memory and configured to be executed by the at least one processor, wherein the at least one program includes an instruction for examining whether an Internet access is requested, determining a candidate AP for providing the Internet access, determining an available AP among the determined candidate APs, displaying the determined candidate AP and available AP, and providing an Internet service on the basis of a specific AP among the determined available APs.

In accordance with a third aspect of the present invention, an electronic device is provided. The device includes a display, at least one modem processor, a memory, an element for examining whether an Internet access is requested, an element for determining a candidate AP for providing the Internet access, an element for determining an available AP among the determined candidate APs, an element for displaying the determined candidate AP and available AP, and an element for providing an Internet service on the basis of a specific AP among the determined available APs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention described hereinafter relates to a Wireless Fidelity (Wi-Fi) access method and an electronic device thereof.

Figure 1:
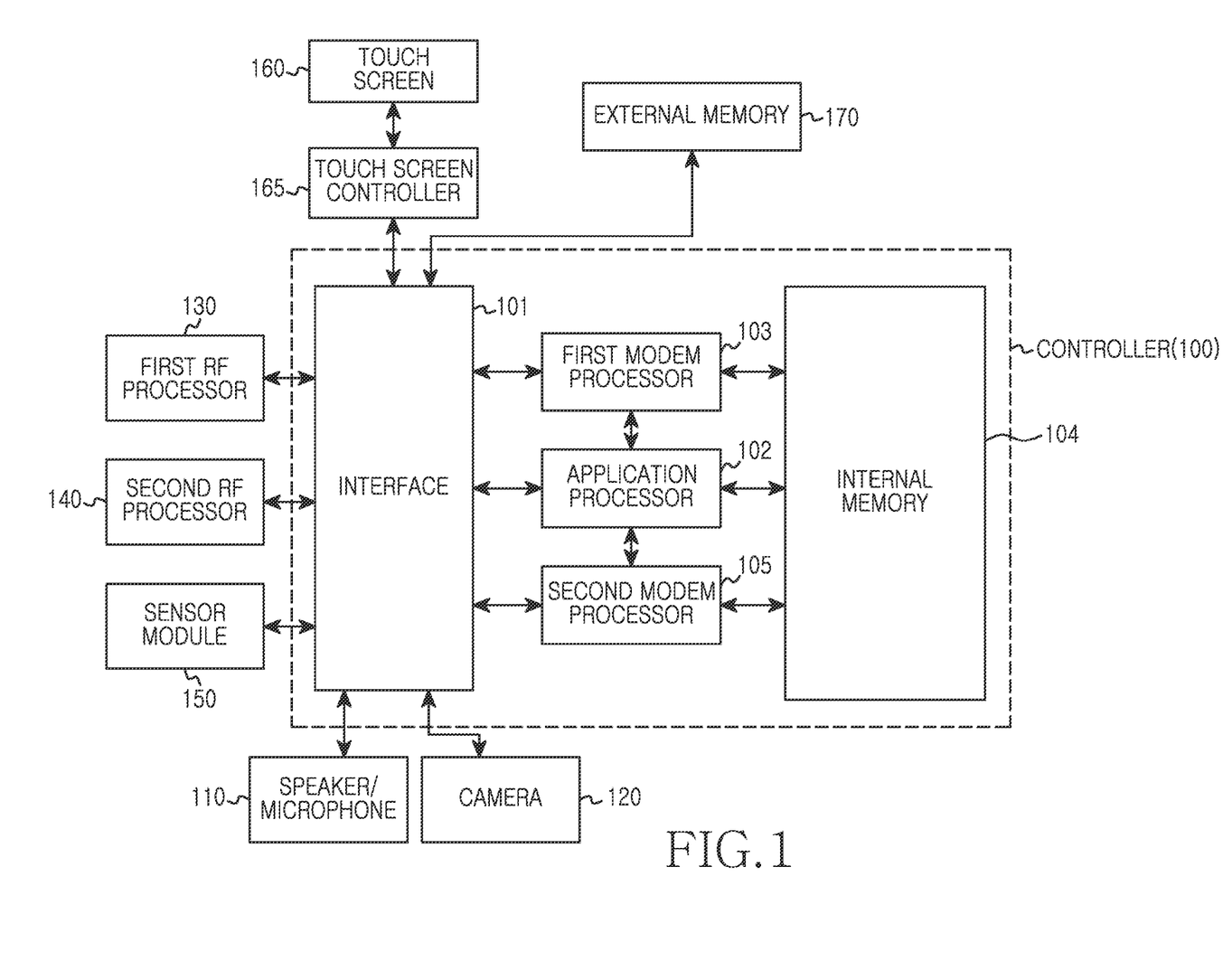
FIG. 1 illustrates a Wi-Fi access procedure according to an exemplary embodiment of the present invention.

FIG. 1 illustrates a Wi-Fi access procedure according to an exemplary embodiment of the present invention.

Referring to FIG. 1, the electronic device may be a portable electronic device. Further, the electronic device may be a portable terminal, a mobile phone, a mobile pad, a media player, a tablet computer, a handheld computer, a portable game console, a Portable/Personal Multimedia Player (PMP), a laptop computer, a digital camera, a handheld e-book, a Personal Digital Assistant (PDA), and the like. In addition, the electronic device may be any portable electronic device including a device which combines two or more functions among such devices.

The electronic device includes a controller 100, a speaker/microphone 110, a camera 120, a first Radio Frequency (RF) processor 130, a second RF processor 140, a sensor module 150, a touch screen 160, a touch screen controller 165, and an external memory 170.

The controller 100 may include an interface 101, one or more processors (e.g., an application processor 102, a first modem processor 103, and a second modem processor 105), and an internal memory 104. Optionally, the entire part of the controller 100 may be referred to as a processor. The interface 101, the application processor 102, the first modem processor 103, the internal memory 104, and the second modem processor 105 may be separate components or may be integrated in one or more integrated circuits.

The application processor 102 performs various functions for the electronic device by executing a variety of software programs. The first modem processor 103 processes and controls voice communication and data communication. The second modem processor 105 processes and controls Wi-Fi communication.

The application processor 102, the first modem processor 103, and the second modem processor 105 may also execute a specific software module (e.g., an instruction set) stored in the external memory 170 or the internal memory 104 and thus perform various specific functions corresponding to the specific software module. For example, the application processor 102, the first modem processor 103, and the second modem processor 105 may perform the method of the exemplary embodiment of the present invention by interworking with software modules stored in the external memory 170 or the internal memory 104.

The first modem processor 103 includes a communication modem. The first mode processor 103 may further include a communication protocol for communication and a codec based on the communication protocol. In addition, according to an implementation situation, the first modem processor 103 may include a protocol such as a Session Initiation Protocol (SIP), a Hyper Text Transfer Protocol (HTTP), a Real-time Transfer Protocol (RTP), a Real Time Control Protocol (RTCP), and a Transmission Control Protocol/Internet Protocol (TCP/IP).

The second modem processor 105 includes a Wi-Fi modem. The second modem processor 105 may further include a communication protocol for communication and a codec based on the communication protocol. A protocol for Wi-Fi communication may be Institute of Electrical and Electronics Engineers (IEEE) 802.11a/b/g/n. In addition, according to an implementation situation, the second modem processor 105 may include a protocol such as SIP, HTTP, RTP, RTCP, TCP/IP, and the like.

According to exemplary embodiments of the present invention, through communication between the second modem processor 105 and a processor using the interface 101, the application processor 102 searches for an Internet-access enabled AP, and provides an Internet service to a user by connecting to the Internet via the found AP.

The interface 101 connects the touch screen controller 165, the external memory 170, or the like of the electronic device to at least one of the application processor 102, the first modem processor 103, the second modem processor 105, or the like.

The sensor module 150 is operatively coupled to the interface 101. According to exemplary embodiments of the present invention, the sensor module 150 can enable various functions. For example, a motion sensor, an optical sensor, and the like can be coupled to the interface 101 to respectively enable motion sensing, external light-beam sensing, and the like. In addition thereto, other sensors such as a location measurement system, a temperature sensor, a biometric sensor, or the like can be coupled to the interface 101 to perform related functions.

The camera 120 can perform a camera function such as image capture, video capture, and the like, by interworking with the application processor 102 via the interface 101.

The first RF processor 130 performs a communication function. For example, an RF signal is converted to a baseband signal under the control of the first modem processor 103, and is then provided to the first modem processor 103, or a baseband signal from the first modem processor 103 is transmitted by being converted into an RF signal. The first modem processor 103 processes the baseband signal by using various communication schemes. For example, although not limited thereto, the communication scheme may include a Global System for Mobile Communication (GSM) communication scheme, an Enhanced Data GSM Environment (EDGE) communication scheme, a Code Division Multiple Access (CDMA) communication scheme, a W-Code Division Multiple Access (W-CDMA) communication scheme, a Long Term Evolution (LTE) communication scheme, an Orthogonal Frequency Division Multiple Access (OFDMA) communication scheme, a Wi-Fi communication scheme, a WiMax communication scheme, a Bluetooth communication scheme, and the like.

The second RF processor 140 performs a communication function. For example, under the control of the second modem processor 105, the second RF processor 140 converts an RF signal into a baseband signal and provides the converted baseband signal to the second modem processor 105 or converts a baseband signal from the second modem processor 105 into an RF signal and transmits the converted RF signal. For example, the second modem processor 105 may include a Wi-Fi communication protocol (e.g., IEEE 802.11a/b/g/n).

The speaker/microphone 110 may input and output an audio stream such as voice recognition, voice reproduction, digital recording, telephony functions, and the like. For example, the speaker/microphone 110 converts an audio signal into an electronic signal or converts the electronic signal into the audio signal. Although not shown, an attachable and detachable ear phone, headphone, or headset can be operatively connected to the electronic device via an external port or via a wireless connection.

The touch screen controller 165 can be coupled to the touch screen 160. Although not limited thereto, the touch screen 160 and the touch screen controller 165 may be configured to use capacitance, resistance, infrared, surface sound wave techniques, and the like for determining one or more contact points. The touch screen 160 and the touch screen controller 165 may be configured to use any multi-touch sense technique including other proximity sensor arrays or other elements to detect a contact, a movement, a stopping thereof, and the like.

The touch screen 160 provides an input/output interface between the electronic device and the user. For example, the touch screen 160 delivers a touch input of the user to the electronic device. In addition, the touch screen 160 is a medium which shows an output from the electronic device to the user. For example, the touch screen shows a visual output to the user. Such a visual output is represented in the form of a text, a graphic, a video, and a combination thereof.

A variety of displays can be used as the touch screen 160. For example, although not limited thereto, the touch screen 160 may include a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), a Flexible LED (FLED), and the like.

The external memory 170 or the internal memory 104 may include a fast random access memory and/or a non-volatile memory, one or more magnetic disc storage devices, a flash memory (e.g., NAND, NOR), and the like.

The external memory 170 or the internal memory 104 stores a software component. The software component includes an operating system software module, a communication software module, a graphic software module, a user interface software module, a Moving Picture Experts Group (MPEG) module, a camera software module, one or more application software modules, and the like.

In addition, because a module (e.g., a software component), can be expressed as a group of instructions, the module can also be expressed as an instruction set. The module may also be expressed as a program. The modules including the instructions can execute corresponding instructions by the application processor 102.

The operating system software includes various software components for controlling a general system operation. The control of the general system operation includes memory control and management, storage hardware (device) control and management, power control and management, and the like. In addition, the operating system software performs a function for facilitating communication between various hardware elements (devices) and software elements (modules).

The communication software module can enable communication with other electronic devices such as a computer, a server, and/or a portable terminal via the first RF processor 130 or the second RF processor 140. Further, the communication software module includes a protocol structure conforming to a corresponding communication scheme.

The graphic software module includes various software components for providing and displaying graphics on the touch screen unit 160. The terminology of "graphics" corresponds to a text, a web page, an icon, a digital image, a video, an animation, and the like.

The user interface software module includes various software components related to the user interface. The user interface software module includes the content related to a specific state to which the user interface changes and a specific condition in which the state of the user interface changes. According to an exemplary embodiment of the present invention, the user interface module provides a user interface for performing a function in which the user finds and determines an Internet-access enabled AP, so that the user can use the Internet via the Internet-access enabled AP.

The camera software module includes a camera-related software component which enables camera-related processes and functions. The application module includes a browser application, an e-mail application, an instant messenger application, a word processing application, a keyboard emulation application, an address book application, a touch list application, a widget application, a Digital Right Management (DRM) application, a voice recognition application, a voice reproduction application, a location determining function, a location-based service, and the like. The memory may further include additional modules (instructions) in addition to the aforementioned modules. Alternatively, optionally, some of the modules (instructions) may not be used.

The codec module performs a function of a codec used in video telephony or voice telephony. There is no restriction on a codec supported in exemplary embodiments of the present invention.

According to exemplary embodiments of the present invention, the protocol stack module performs a function of a protocol used in the electronic device. The protocol module can perform a function of a protocol (e.g., SIP, HTTP, RTP/RTCP, TCP/IP, and the like). There is no restriction on a protocol supported in exemplary embodiments of the present invention.

According to exemplary embodiments of the present invention, the application module (e.g., Wi-Fi control program) may include an instruction for determining an Internet-access enabled AP by using the second modem processor 105 and the second RF processor 140, and for automatically connecting to the AP.

In addition, according to exemplary embodiments of the present invention, the application module uses a Domain Name Server (DNS) query and a Transmission Control Protocol (TCP) connection function to confirm validity of an Internet access. In general, a ping command is used to confirm accessibility with respect to an IP communication device. However, the IP communication device may be configured not to respond to the ping command or a firewall may be installed in a network of an AP connected thereto. Therefore, because the ping command may not be able to be used, the application module uses the DNS query and the TCP connection function.

In addition, various functions of the electronic device of exemplary embodiments of the present invention, described above and to be described below, may be performed using one or more stream processors and/or a hardware component including an Application Specific Integrated Circuit (ASIC) and/or a software component and/or a combination thereof.

Figure 2A:
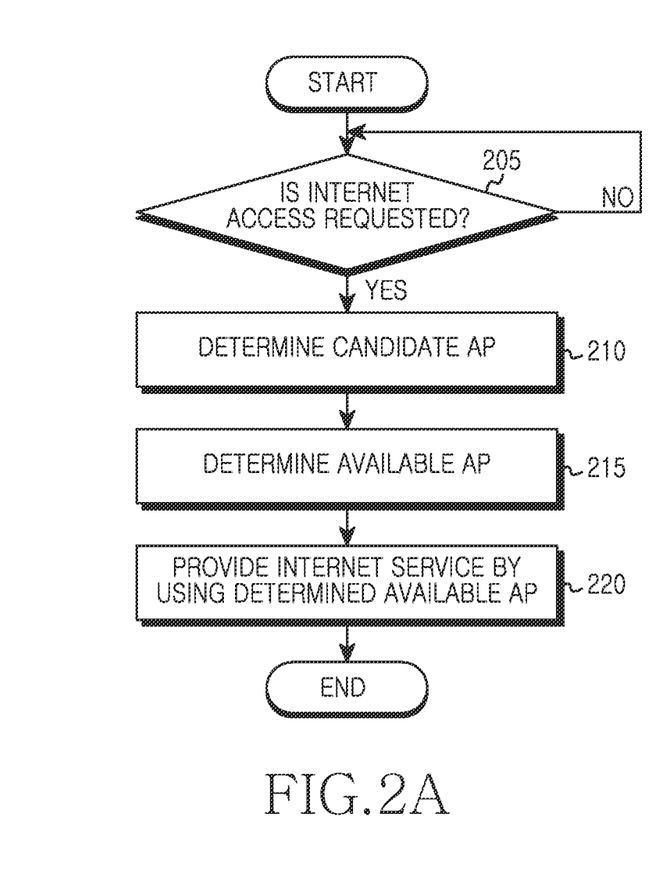
FIGS. 2A and 2B illustrate procedures of operating an electronic device and combinations of corresponding elements according to an exemplary embodiment of the present invention.
Figure 2B:
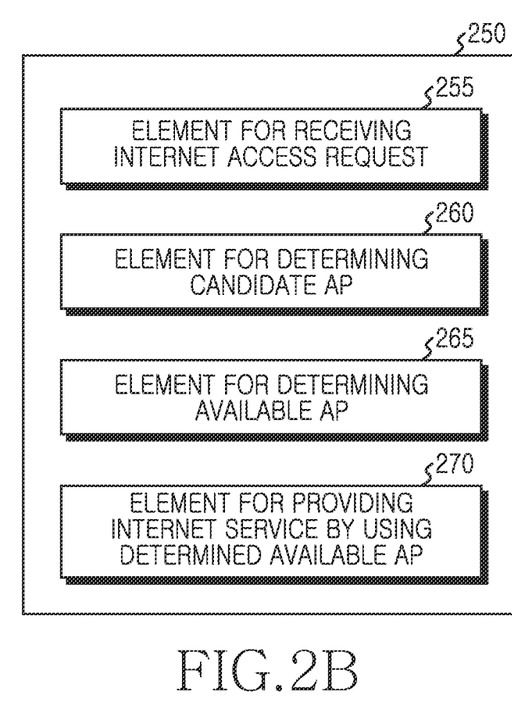

FIGS. 2A and 2B illustrate procedures of operating an electronic device and combinations of corresponding elements according to an exemplary embodiment of the present invention.

Referring to FIG. 2A, in step 205, the electronic device determines whether the electronic device received an Internet access request. If the electronic device determines that the electronic device has not received an Internet access request, then the electronic device may continue to poll for receipt of an Internet access request. In contrast, if the electronic device determines that the electronic device receives an Internet access request from a user in step 205, then the electronic device proceeds to step 210 in which the electronic device determines a candidate AP for an Internet access. A process of determining the candidate AP will be described below in greater detail with reference to FIGS. 3A and 3B.

Thereafter, in step 215, the electronic device determines an available AP which can use the Internet on the basis of the determined candidate AP. In step 220, the electronic device provides an Internet service by using the determined available AP in step 220. A process of determining the available AP on the basis of the determined candidate AP will be described below in greater detail with reference to FIG. 4 and FIG. 5.

In order for the electronic device to perform the procedure of FIG. 2A, the electronic device may include elements of FIG. 2B.

Referring to FIG. 2B, the electronic device 250 may include an element 255 for receiving an Internet access request from a user, an element 260 for determining a candidate AP to determine an available AP, an element 265 for determining an available AP which can use the Internet on the basis of the determined candidate AP, and an element 270 for providing an Internet service by using the determined available AP.

Figure 3A:
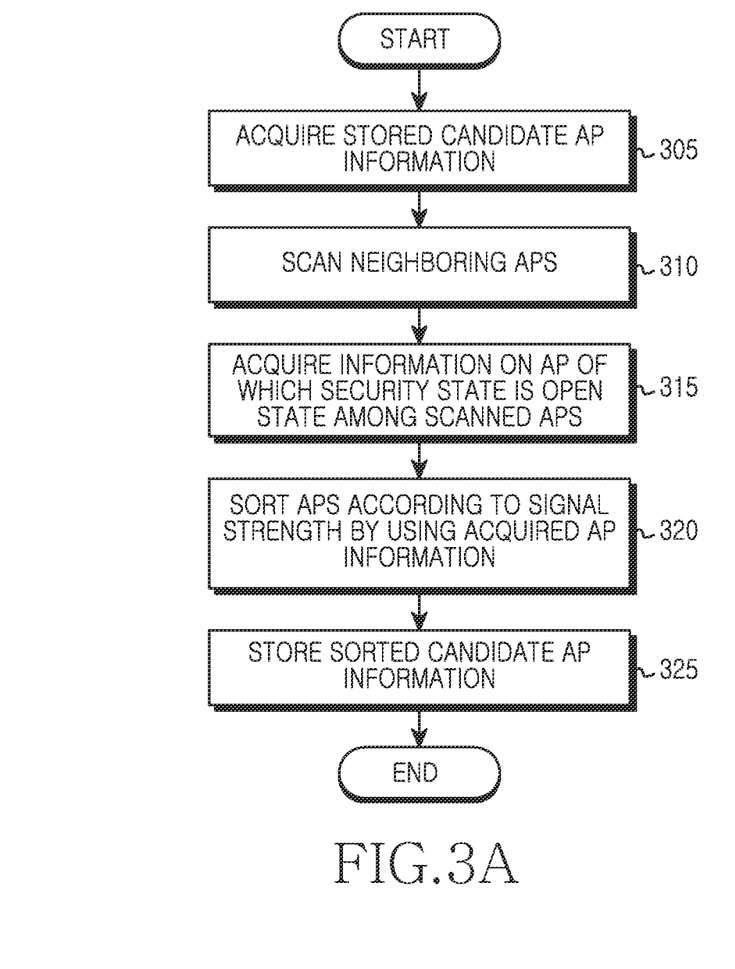
FIGS. 3A and 3B illustrate procedures of acquiring candidate Access Point (AP) information of an electronic device and corresponding elements according to an exemplary embodiment of the present invention.
Figure 3B:
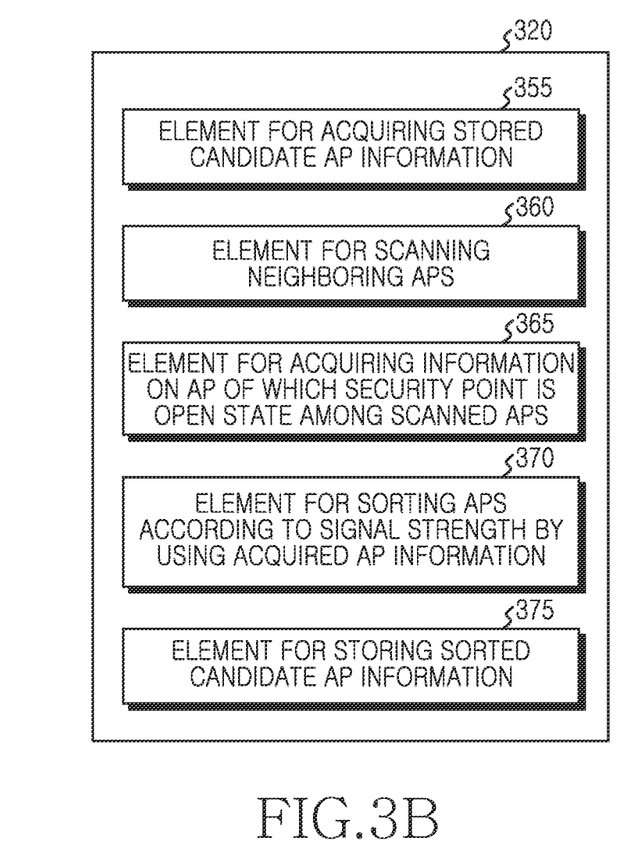

FIGS. 3A and 3B illustrate procedures of acquiring candidate AP information of an electronic device and corresponding elements according to an exemplary embodiment of the present invention.

Referring to FIG. 3A, in step 305, the electronic device acquires stored candidate AP information.

In step 310, the electronic device scans neighboring APs. In general, the AP broadcasts a beacon signal having a specific period. The electronic device receives the beacon signal, and can recognize a specific neighboring AP on the basis of information included in the beacon signal. In addition, the electronic device can measure signal strength of the beacon signal to recognize signal strength of an AP which transmits the beacon signal and a distance between the electronic device and the AP which transmits the beacon signal.

Thereafter, in step 315, the electronic device acquires information on an AP of which a security state is an open state among the scanned APs. For example, the electronic device identifies the APs having an open network (e.g., in relation to security preferences and/or the electronic device permission profile) from among the scanned APs. The electronic device then acquires information for the APs corresponding to an open network.

Thereafter, in step 320, the electronic device sorts the APs according to signal strength by using the acquired AP information. In the sorting process (e.g., in the sorting of the APs according to signal strength), the electronic device excludes from the candidate AP an AP which is included in the stored candidate AP information but is not included in scanned neighboring AP information.

Thereafter, in step 325, the electronic device stores the sorted candidate AP information.

In order for the electronic device to perform the procedure of FIG. 3A, the electronic device may include elements of FIG. 3B.

Referring to FIG. 3B, the electronic device of 320 may include an element 355 for acquiring stored candidate AP information, an element 360 for scanning neighboring APs, an element 365 for acquiring information on an AP of which a security point is an open state among the scanned APs, an element 370 for sorting APs according to signal strength by using the acquired AP information, and an element 375 for storing the sorted candidate AP information.

Figure 4:
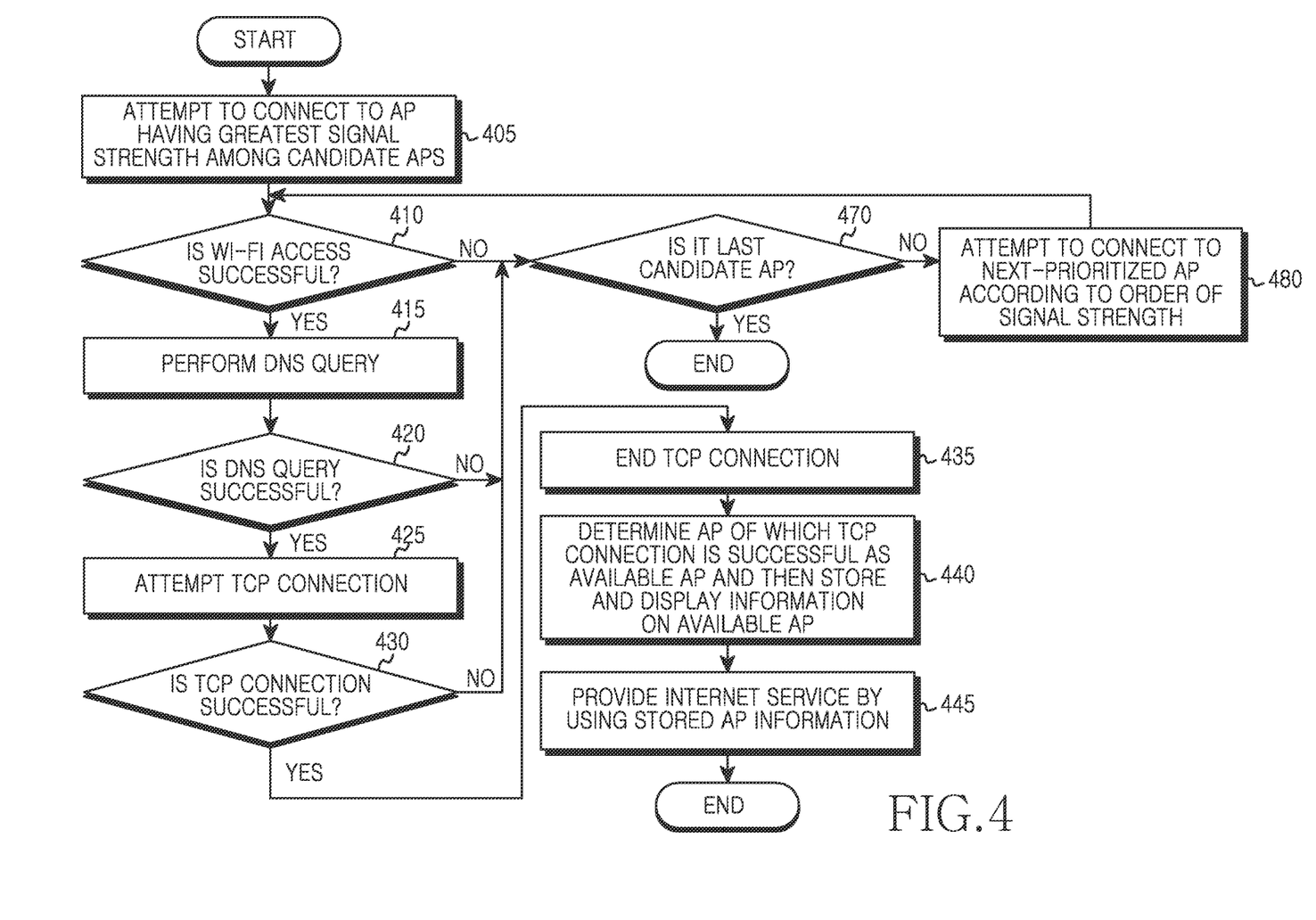
FIG. 4 illustrates a procedure of determining an available AP on a basis of candidate AP information according to an exemplary embodiment of the present invention.

FIG. 4 illustrates a procedure of determining an available AP on a basis of candidate AP information according to an exemplary embodiment of the present invention.

Referring to FIG. 4, in step 405, the electronic device attempts to connect to an AP having the greatest signal strength among candidate APs. For example, the electronic device attempts a Wi-Fi access. In step 405, the electronic device may display that the Wi-Fi access is currently being attempted.

In step 410, the electronic device determines whether the Wi-Fi access is successful. If the electronic device determines that the Wi-Fi access is not successful in step 410, then the electronic device proceeds to step 470. In contrast, if the electronic device determines that the Wi-Fi access is successful in step 410, then the electronic device proceeds to step 415 in which the electronic device performs a DNS query. The process of the DNS query may correspond to a process of acquiring an Internet Protocol (IP) address of a pre-defined specific server. For example, the process of DNS query may correspond to a process of acquiring an IP address of "www.samsung.com".

In step 420, the electronic device determines whether the DNS query is successful. If the electronic device determines that the DNS query is not successful in step 420, then the electronic device proceeds to step 470. In contrast, if the electronic device determines that the DNS query is successful in step 420 (e.g., if the electronic device acquires the IP address of the specific server), then the electronic device proceeds to step 425 in which the electronic device attempts a TCP connection to the acquired IP address. The TCP connection includes a TCP 3-way handshaking process.

In step 430, the electronic device determines whether the TCP connection is successful. If the electronic device determines that the TCP connection is not successful, then the electronic device proceeds to step 470. In contrast if the electronic device determines that the TCP connection is successful in step 430, then the electronic device proceeds to step 435 in which the electronic device ends the TCP connection.

Thereafter, in step 440, the electronic device determines an AP of which a TCP connection is successful as an available AP stores and displays information on the available AP. For example, the electronic device determines which AP corresponds to the AP for which TCP connection is successful, and the electronic device stores and displays information corresponding to such an AP.

Thereafter, in step 445, the electronic device provides an Internet service by using the stored AP information.

If the electronic device determines that the Wi-Fi access fails in step 410, or if electronic device determines that the DNS query fails in step 420, or if electronic device determines that the TCP connection fails in step 430, then the Wi-Fi device (e.g., or the electronic device) can display that the Wi-Fi access fails. In addition, if the AP performs captive portal authentication, the electronic device may display that the captive portal authentication is performed. The TCP connection may fail as a result of the electronic device and a DNS server being located in the same intranet and thus a DNS query is possible, but packet transmission and reception through an external network (e.g., Internet) are not possible.

Thereafter, in step 470, the electronic device determines whether the AP for which an examination (e.g., a determination) as to whether the Internet connection is possible corresponds to the last AP. If the electronic device determines that an AP for which an examination (e.g., a determination) as to whether the Internet connection is possible does not correspond to a last AP in step 470, then the electronic device proceeds to step 480 in which the electronic device attempts to connect to a next-prioritized AP according to the order of signal strength. Thereafter, the electronic device proceeds to step 410 at which the electronic device performs the subsequent steps. In contrast, if the electronic device determines that an AP for which an examination (e.g., a determination) as to whether the Internet connection is possible does not correspond to a last AP in step 470, then the electronic device ends the process.

Figure 5:
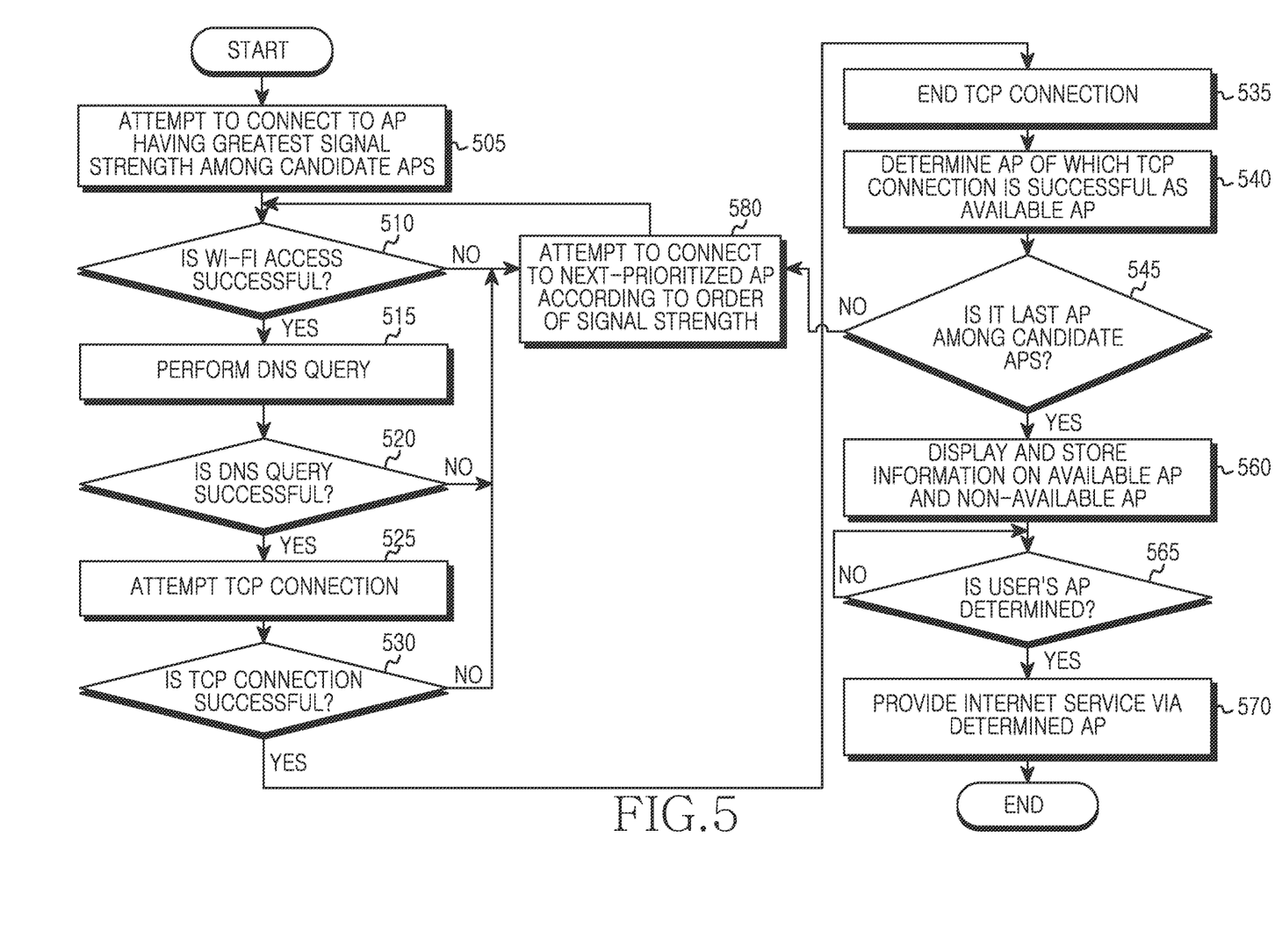
FIG. 5 illustrates a procedure of determining an available AP on a basis of candidate AP information according to an exemplary embodiment of the present invention.

FIG. 5 illustrates a procedure of determining an available AP on a basis of candidate AP information according to an exemplary embodiment of the present invention.

Referring to FIG. 5, in step 505, the electronic device attempts to connect to an AP having the greatest signal strength among candidate APs. For example, the electronic device attempts a Wi-Fi access. In this process, the electronic device may display that the Wi-Fi access is currently being attempted.

In step 510, the electronic device determines whether Wi-Fi is successful. If the electronic device determines that the Wi-Fi is not successful in step 510, then the electronic device may proceed to step 580. In contrast, if the electronic device determines that the Wi-Fi access is successful in step 510, then the electronic device proceeds to step 515 in which the electronic device performs a DNS query. The process of the DNS query may correspond to a process of acquiring an IP address of a pre-defined specific server. For example, the DNS query process may correspond to a process of acquiring an IP address of "www.samsung.com".

In step 520, the electronic device determines whether the DNS query is successful. If the electronic device determines that the DNS query is not successful in step 520, then the electronic device proceeds to step 580. In contrast, if the electronic device determines that the DNS query is successful in step 520 (e.g., if the electronic device acquires the IP address of the specific server), then the electronic device proceeds to step 525 in which the electronic device attempts a TCP connection to the acquired IP address. The TCP connection includes a TCP 3-way handshaking process.

In step 530, the electronic device determines whether the TCP connection is successful. If the electronic device determines that the TCP connection is not successful in step 530, then the electronic device proceeds to step 580. In contrast, if the electronic device determines that the TCP connection is successful in step 530, then the electronic device proceeds to step 535 in which the electronic device ends the TCP connection. Thereafter, in step 540, the electronic device determines an AP of which a TCP connection is successful as an available AP. For example, the electronic device identifies the AP for which TCP connection is successful as being an available AP.

Thereafter, in step 545 the electronic device determines whether an AP examined (e.g., determined) for the possibility of Internet connection corresponds to a last AP. If the electronic device determines that the AP being examined (e.g., determined) for the possibility of Internet connection does not correspond to a last AP in step 545, then the electronic device proceeds to step 580 in which the electronic device attempts to connect to a next-prioritized AP according to the order of signal strength. Thereafter, the electronic device proceeds to step 510 and performs the subsequent steps.

Figure 6:
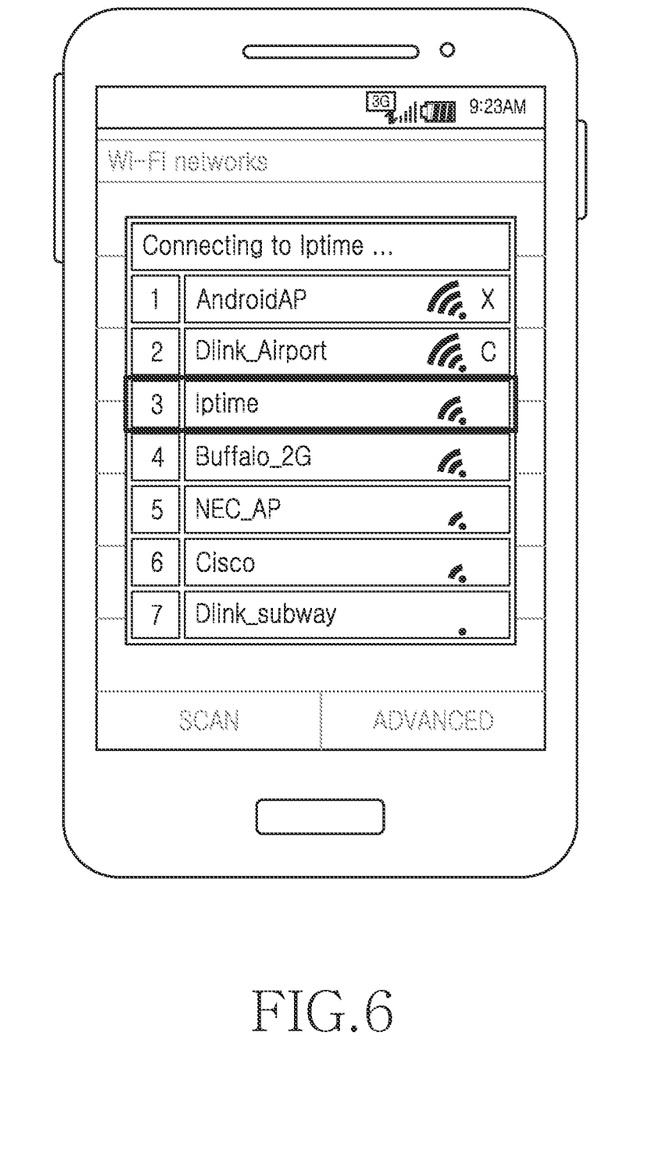
FIG. 6 illustrates a user interface indicating whether Internet service is available for an AP according to an exemplary embodiment of the present invention.

In contrast, if the electronic device determines that the AP being examined (e.g., determined) for the possibility of Internet connection corresponds to the last AP in step 545, then the electronic device proceeds to step 560 in which the electronic device stores information on an available AP and a non-available AP among the candidate APs examined up to that point in the process is stored as new candidate AP information and is then displayed. An example of a display screen is illustrated in FIG. 6. If the AP performs captive portal authentication, the electronic device can display that the captive portable authentication is performed.

In step 565, the electronic device determines whether an AP to be used by a user is determined. If the electronic device determines that an AP to be used by a user is determined in step 565, then the electronic device proceeds to step 570 in which the electronic device provides an Internet service via the determined AP. In contrast, if the electronic device determines that an AP to be used by a user is not determined in step 565, then the electronic device continues to poll to determine whether an AP to be used by the user is determined.

If the electronic device determines that the Wi-Fi access fails in step 510, or if the electronic device determines that the DNS query fails in step 520, or if the electronic device determines that the TCP connection fails in step 530, the Wi-Fi device can display that the Wi-Fi access fails. In addition, if the AP performs captive portal authentication, the electronic device may display that the captive portal authentication is performed. The TCP connection may fail as a result of the electronic device and a DNS server being located in the same intranet and thus a DNS query is possible, but packet transmission and reception through an external network (i.e., Internet) are not possible.

FIG. 6 illustrates a user interface indicating whether Internet service is available for an AP according to an exemplary embodiment of the present invention.

Referring to FIG. 6, among candidate APs, an available AP is indicated by "o", and a non-available AP is indicated by "x". Whether an AP "Iptime" is available is currently under examination. For example, an AP currently under examination may be displayed emphatically or may otherwise be associated with an indicia indicating that the AP is currently under examination.

In addition, when the AP performs captive portal authentication, "C" indicates that the captive portal authentication must be performed.

According to exemplary embodiments of the present invention, the electronic device may display a list of APs. For example, the list of APs may indicate APs within communication range of the electronic device (e.g., detected APs). The list of APs may identify APs for which Internet connection is possible (e.g., available APs). The list of APs may identify APs currently under examination (e.g., for possible Internet connectivity). The list of APs may identify APs which are closed network APs or otherwise have security restrictions preventing the electronic device from gaining access thereto. The list of APs may identify which APs are determined as not having Internet connectivity (e.g., non-available APs).

According to exemplary embodiments of the present invention, an electronic device using Wi-Fi can provide a valid Internet service to a user by connecting to an Internet-access enabled AP, and thus unnecessary AP searching is avoided, which prevents power from being wasted by the electronic device.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A method of connecting to an access point (AP) by which an electronic device can access an Internet, the method comprising:
   identifying a plurality of candidate APs;
   transmitting, to each of the plurality of candidate APs, a predetermined query which is designated to be sent to a domain name server (DNS) requesting an Internet Protocol (IP) address of a pre-defined specific server;
   receiving a response to the predetermined query from at least one AP of the plurality of candidate APs;
   transmitting, to the responding at least one AP, a request to establish a transmission control protocol (TCP) connection;
   establishing the TCP connection with an AP of the responding at least one AP;
   ending the TCP connection;
   storing information of the AP of the responding at least one AP;
   displaying a list of the plurality of candidate APs; and
   providing Internet service through the AP of the responding at least one AP,
   wherein the displaying of the list of the plurality of candidate APs comprises:
      displaying the AP of the responding at least one AP differently than APs of the plurality of APs that did not respond to the predetermined query, and
      displaying a visual feedback identifying the AP of the responding at least one AP as an internet connectable AP.

2. The method of claim 1, wherein the identifying of the plurality of candidate APs comprises:
   scanning for neighboring APs, and
   determining a neighboring AP of the neighboring APs for which a security state is an open state as a candidate AP.

3. An electronic device comprising:
   a display;
   a communication interface;
   at least one processor; and
   at least one memory storing one or more computer programs configured to be executed by the at least one processor, the one or more computer programs including instructions for:
      identifying a plurality of candidate access points (APs),
      controlling the communication interface to transmit, to each of the plurality of candidate APs, a predetermined query which is designated to be sent to a domain name server (DNS) requesting an Internet Protocol (IP) address of a pre-defined specific server,
      controlling the communication interface to receive a response for the predetermined query from at least one AP of the plurality of candidate APs,
      controlling the communication interface to transmit, to the responding at least one AP, a request to establish a transmission control protocol (TCP) connection,
      controlling the communication interface to establish the TCP connection with an AP of the responding at least one AP,
      controlling to end the TCP connection,
      controlling to store information of the AP of the responding at least one AP,
      controlling the display to display a list of the plurality of candidate APs, and
      controlling to provide Internet service through the AP of the responding at least one AP,
   wherein the controlling of the display to display the list of the plurality of candidate APs comprises:
      controlling the display to display the AP of the responding at least one AP differently than APs of the plurality of APs that did not respond to the predetermined query, and
      controlling the display to display a visual feedback identifying the AP of the responding at least one AP as an Internet connectable AP.

4. The electronic device of claim 3, wherein the one or more computer programs further include instructions for:
scanning for neighboring APs, and
determining a neighboring AP of the neighboring APs for which a security state is an open state as a candidate AP.

5. An electronic device comprising:
a display;
a communication interface;
a memory;
an element configured to receive a request to access an Internet network;
an element for scanning for neighboring access points (APs) based on the request to access the internet network;
an element for determining a plurality of candidate APs from among the scanned neighboring APs;
an element for transmitting, to each of the plurality of candidate APs, a predetermined query which is designated to be sent to a domain name server (DNS) requesting an Internet Protocol (IP) address of a pre-defined specific server;
an element for receiving a response for the predetermined query from at least one AP of the plurality of candidate APs;
an element for transmitting, to the responding at least one AP, a request to establish a transmission control protocol (TCP) connection;
an element for establishing the TCP connection with an AP of the responding at least one AP;
an element for ending the TCP connection;
an element for storing information of the AP of the responding at least one AP;
an element for displaying a list of the plurality of candidate APs; and
an element for providing Internet service through the AP of the responding at least one AP,
wherein the displaying of the list of the plurality of candidate APs comprises
displaying the AP of the responding at least one AP differently than APs of the plurality of APs that did not respond to the predetermined query, and
displaying a visual feedback identifying the AP of the responding at least one AP as an internet connectable AP.

6. The electronic device of claim 5, wherein the element for determining the plurality of candidate APs comprises:
an element for acquiring stored candidate AP information,
an element for acquiring information on any AP for which a security state is an open state among the scanned neighboring APs,
an element for sorting the plurality of candidate APs according to signal strength based on the acquired information, and
an element for storing information on the sorted plurality of candidate APs.

7. The electronic device of claim 6, wherein the element for sorting the plurality of candidate APs according to the signal strength based on the acquired information is configured to exclude from the plurality of candidate AP any AP in the stored candidate AP information that is not found when scanning for the neighboring APs.

8. The electronic device of claim 5, wherein the DNS and the electronic device are located in the same intranet when transmitting the predetermined query.

9. A non-transient computer-readable storage medium configured to store one or more programs including instructions that, when performed by an electronic device, cause the electronic device to control for:
identifying a plurality of candidate APs;
transmitting, to each of the plurality of candidate APs, a predetermined query which is designated to be sent to a domain name server (DNS) requesting an Internet Protocol (IP) address of a pre-defined specific server;
receiving a response to the predetermined query from at least one AP of the plurality of candidate APs;
transmitting, to the responding at least one AP, a request to establish a transmission control protocol (TCP) connection;
establishing the TCP connection with an AP of the responding at least one AP;
ending the TCP connection;
storing information of the AP of the responding at least one AP;
displaying a list of the plurality of candidate APs; and
providing Internet service through the AP of the responding at least one AP,
wherein the displaying of the list of the plurality of candidate APs comprises:
displaying the AP of the responding at least one AP differently than APs of the plurality of APs that did not respond to the predetermined query, and
displaying a visual feedback identifying the AP of the responding at least one AP as an Internet connectable AP.

* * * * *